US012582876B2

(12) United States Patent
Mizuno

(10) Patent No.: US 12,582,876 B2
(45) Date of Patent: Mar. 24, 2026

(54) GOLF BALL

(71) Applicant: BRIDGESTONE SPORTS CO., LTD., Tokyo (JP)

(72) Inventor: Yuki Mizuno, Chichibushi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 167 days.

(21) Appl. No.: 18/545,590

(22) Filed: Dec. 19, 2023

(65) Prior Publication Data

US 2024/0198181 A1 Jun. 20, 2024

(30) Foreign Application Priority Data

Dec. 20, 2022 (JP) ................................. 2022-203189

(51) Int. Cl.
| | |
|---|---|
| *A63B 37/12* | (2006.01) |
| *A63B 37/00* | (2006.01) |
| *C09D 7/65* | (2018.01) |
| *C09D 175/04* | (2006.01) |

(52) U.S. Cl.
CPC .......... *A63B 37/00221* (2020.08); *C09D 7/65* (2018.01); *C09D 175/04* (2013.01)

(58) Field of Classification Search
CPC .......... A63B 37/0022; A63B 37/00221; C09D 7/66; C09D 175/04
See application file for complete search history.

(56) References Cited

U.S. PATENT DOCUMENTS

| | | | |
|---|---|---|---|
| 5,789,486 A | 8/1998 | Maruoka et al. | |
| 2006/0030428 A1 | 2/2006 | Ohira | |
| 2010/0144468 A1* | 6/2010 | Tarao ............... | A63B 37/00221 |
| | | | 473/378 |
| 2017/0107399 A1 | 4/2017 | Suzuki et al. | |

FOREIGN PATENT DOCUMENTS

| | | |
|---|---|---|
| JP | 8-10356 A | 1/1996 |
| JP | 2006-51357 A | 2/2006 |
| JP | 2017-77357 A | 4/2017 |

* cited by examiner

*Primary Examiner* — Raeann Gorden
(74) *Attorney, Agent, or Firm* — Sughrue Mion, PLLC

(57) ABSTRACT

A golf ball includes one or more coating layer on a golf ball surface having a plurality of dimples thereon. At least one coating layer is formed of a two-component curable urethane coating composition having a polyol component and a polyisocyanate component, which polyol component is an acrylic polyol or a polyester polyol. The coating composition contains less than 5 wt % of polyurethane particles, relative to base resin solids within the composition. The coating layer formed on the ball surface suppresses coating sag, improves the film thickness edge ratio between the film thickness at the middle portion and the film thickness at edge portions of the dimples, and has an improved scuff resistance, peel resistance and marking protective effect.

5 Claims, 2 Drawing Sheets

GOLF BALL

CROSS-REFERENCE TO RELATED APPLICATIONS

This non-provisional application claims priority under 35 U.S.C. § 119(a) on Patent Application No. 2022-203189 filed in Japan on Dec. 20, 2022, the entire contents of which are hereby incorporated by reference.

TECHNICAL FIELD

The present invention relates to a golf ball whose surface has been coated with a two-component curable urethane coating. More particularly, the invention relates to a golf ball having a uniform coating layer formed thereon, which coating layer has an excellent scuff resistance and an excellent peel resistance.

BACKGROUND ART

The surface portion of a golf ball is often coated with a coating composition in order to protect the ball surface or to maintain an aesthetic appearance. Two-component curable polyurethane coatings prepared by mixing together a polyol and a polyisocyanate just prior to use are chiefly employed as such golf ball coating compositions because of their ability to withstand major deformation, impact and abrasion.

The soft coatings hitherto used on golf balls are soft and have excellent scuff resistance, peel resistance and luster, but when such coatings have been applied onto golf balls, the film thickness at dimple edges becomes thin and so those areas tend to have a poor scuff resistance and peel resistance. For example, JP-A 2017-77357 describes a coating composition in which the chief ingredient is a urethane coating made of polyol and polyisocyanate. This coating composition uses an acrylic polyol as the polyol, and the coat obtained with this composition has an elastic work recovery of 70% or more. However, it is difficult with such a coating composition having a high elastic work recovery to uniformly form a thick coat, especially on a surface having recessed curved features such as dimples. In particular, at the dimple edges where the dimples adjoin non-dimple areas of the ball surface (land areas), the film thickness becomes thin, as a result of which the scuff resistance and the peel resistance cannot be satisfactorily improved. This may also lead to a decline in the aerodynamic performance of the golf ball.

In other related art, JP-A 2006-51357 describes a golf ball in which the coating contains silica particles having an average particle size of 200 nm or less, and JP-A H08-10356 describes a coating having dispersed therein polymer gel fine particles of, for example, an acrylic-styrene copolymer resin. However, even the golf balls disclosed in this prior art do not demonstrate sufficient improvement in the scuff resistance and peel resistance of the coating layer thereon.

SUMMARY OF THE INVENTION

It is therefore an object of the present invention to provide a golf ball in which the film thickness edge ratio between the film thickness at the middle portion and the film thickness at edge portions of the dimples is improved, enabling the scuff resistance and peel resistance of the coating layer and the marking protective effect to be improved.

As a result of intensive investigations, I have found that, in a golf ball having a coating layer made of a two-component curable urethane coating composition on a golf ball surface with numerous dimples thereon, by using an acrylic polyol or a polyester polyol as the polyol component and by including within the coating composition less than 5 wt % of polyurethane particles, relative to base resin solids within the coating composition, coating sag is suppressed, the film thickness edge ratio between the film thickness at the middle portion and the film thickness at edge portions of the dimples is improved, and the scuff resistance, peel resistance and marking protective effect of the coating layer can be improved.

Accordingly, the invention provides a golf ball which includes one or more coating layer on a golf ball surface having a plurality of dimples thereon, wherein at least one coating layer is formed of a two-component curable urethane coating composition comprising a polyol component and a polyisocyanate component, the polyol component being an acrylic polyol or a polyester polyol and the coating composition containing less than 5 wt % of polyurethane particles, relative to base resin solids within the composition.

In a preferred embodiment of the golf ball of the invention, the polyurethane particles have an average particle size, as measured by the BET method, which is from 0.1 to 1.0 μm.

In another preferred embodiment of the inventive golf ball, the two-component curable urethane coating composition comprises a polyol component made up primarily of a hydroxyl group-containing polyester polyol having an alicyclic structure on the molecule, and a non-yellowing polyisocyanate.

In yet another preferred embodiment, the two-component curable urethane coating composition comprises a polyol component made up primarily of an acrylic polyol and an isocyanate component made up primarily of an elastomeric modified polyisocyanate.

In still another preferred embodiment, the two-component curable urethane coating composition has a viscosity following mixture of the two components which, as measured by the test method of JIS K 5600-2-2 (1999), is at least 0.025 Pa·s.

Advantageous Effects of the Invention

The golf ball of the invention suppresses coating sag, has an improved film thickness edge ratio between the film thickness at the middle portion of the dimples and the film thickness at edge portions of the dimples, and has an improved coating layer wear resistance, peel resistance and marking protective effect.

DETAILED DESCRIPTION OF THE INVENTION

Figure 2:
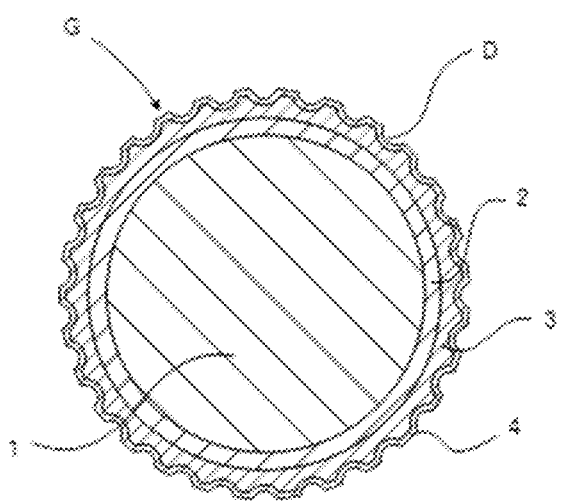
FIG. 2 is a schematic cross-sectional view of the golf ball according to the invention.

The objects, features and advantages of the invention will become more apparent from the following detailed description taken in conjunction with the attached diagram. Referring to FIG. 2, the golf ball of the invention is a golf ball G having three pieces that include core 1, intermediate layer 2 encasing core 1, and cover 3 encasing intermediate layer 2. Numerous dimples D are typically formed on the surface of cover 3. Coating layer 4 is applied onto the surface of cover 3.

The golf ball of the invention has a coating layer formed by applying a coating composition onto a golf ball surface having a plurality of dimples thereon. The role of this coating layer is to protect the overall ball and to impart luster and an aesthetic appearance to the ball surface. Specifically, the invention uses a two-component curable urethane coating composition comprised of a polyol component and a polyisocyanate component. Moreover, it is preferable to use a two-component curable urethane coating composition comprised of a polyol component made up primarily of a hydroxyl group-containing polyester polyol having an alicyclic structure on the molecule and a non-yellowing polyisocyanate, or a two-component curable urethane coating composition comprised of a polyol component made up primarily of an acrylic polyol and an elastomeric modified polyisocyanate.

Two-Component Curable Urethane Coating Comprising a Polyol Component Made Up Primarily of a Hydroxyl Group-Containing Polyester Polyol Having an Alicyclic Structure on the Molecule and a Non-Yellowing Polyisocyanate The hydroxyl group-containing polyester polyol having an alicyclic structure on the molecule is obtained by reacting a polyhydric alcohol ingredient having an alicyclic structure on the molecule with a polybasic acid ingredient having an alicyclic structure on the molecule.

Preferred examples of the polyhydric alcohol ingredient having an alicyclic structure on the molecule include diols such as 1,3-cyclohexanedimethanol, 1,4-cyclohexanedimethanol and mixtures of these. Preferred examples of the polybasic acid ingredient having an alicyclic structure on the molecule include dicarboxylic acids such as tetrahydrophthalic acid, hexahydrophthalic acid, 1,3-cyclohexanedicarboxylic acid and 1,4-cyclohexanedicarboxylic acid, as well as acid anhydrides of these, acid halides of these, and mixtures thereof.

The polyhydric alcohol ingredient having an alicyclic structure on the molecule and the polybasic acid ingredient having an alicyclic structure on the molecule may account for some or all of the ingredients making up the hydroxyl group-containing polyester. The polyhydric alcohol ingredient having an alicyclic structure on the molecule accounts for preferably at least 3 wt %, and more preferably from 5 to 40 wt %, of all the polyhydric alcohol ingredient. The polybasic acid ingredient having an alicyclic structure on the molecule accounts for preferably at least 5 wt %, and more preferably from 10 to 55 wt %, of all the polybasic acid ingredient. When the contents of the polyhydric alcohol ingredient having an alicyclic structure and the polybasic acid ingredient having an alicyclic structure fall outside of the above ranges, the durability of the coated golf ball to sand abrasion and grass staining becomes inadequate.

Examples of polyhydric alcohol ingredients not having an alicyclic structure on the molecule that can be used together with the polyhydric alcohol ingredient having an alicyclic structure on the molecule include ethylene glycol, diethylene glycol, triethylene glycol, propylene glycol, dipropylene glycol, butylene glycol, 1,6-hexanediol, neopentyl glycol, 3,3-dimethylolheptane, polyethylene glycol, polypropylene glycol, glycerol, trimethylolethane, trimethylolpropane, pentaerythritol and mixtures of these.

Polybasic acid ingredients which do not have an alicyclic structure on the molecule that can be used together with the polybasic acid ingredient having an alicyclic structure on the molecule include dicarboxylic acids such as adipic acid, sebacic acid, dimer acid, phthalic acid, isophthalic acid, terephthalic acid, maleic acid, fumaric acid and itaconic acid, and also acid anhydrides of these, acid halides of these, and mixtures thereof.

As mentioned above, the hydroxyl group-containing polyester can be obtained by carrying out an esterification reaction between the above polyhydric alcohol ingredient and the above polybasic acid ingredient. The hydroxyl group-containing polyester obtained in this way has a weight-average molecular weight, as measured by gel permeation chromatography (GPC), of preferably from 3,000 to 35,000 and has a hydroxyl value of preferably from 50 to 300, and more preferably from 150 to 250. Outside the above ranges in the weight-average molecular weight and the hydroxyl value of the hydroxyl group-containing polyester, the durability of the coated golf ball to sand abrasion and grass staining becomes inadequate.

Examples of the non-yellowing polyisocyanate include adducts, biurets and isocyanurates of hexamethylene diisocyanate, isophorone diisocyanate and hydrogenated xylylene diisocyanate, as well as mixtures of these.

It is preferable to use the above hydroxyl group-containing polyester and non-yellowing polyisocyanate in a molar ratio of the isocyanate groups on the non-yellowing polyisocyanate to the hydroxyl groups on the hydroxyl group-containing polyester within the range of 0.8 to 1.3.

Two-Component Curable Urethane Coating Comprising Primarily a Polyol Component Made Up Chiefly of an Acrylic Polymer, and an Elastomeric Modified Polyisocyanate "Acrylic polymer" refers here to a compound having a main chain made up of an acrylic polymer and side chains made up of polyester and/or polyether.

The structure of the acrylic polymer is not particularly limited. Any structure is acceptable so long as acrylic recurring units serve as the basic backbone. The acrylic monomer making up the main chain may be of one type only or may be of two or more types. Alternatively, the acrylic monomer may be copolymerized with another monomer that is copolymerizable therewith.

Exemplary acrylic polymer structures include (i) ones obtained by adding ingredients that form, for example, lactone or alkylene oxide side chains on the acrylic polymer main chain, (ii) ones obtained by adding a novel monomer and initiator in the presence of an acrylic polymer and grafting side chains onto the acrylic polymer main chain by polymerizing the monomer, (iii) ones obtained by homopolymerizing an acrylic monomer to which a polyester has been added (abbreviated below as "polyester-containing acrylic monomer") and/or an acrylic monomer to which a polyether has been added (abbreviated below as "polyether-containing acrylic monomer"), and (iv) ones obtained by copolymerizing a polyester-containing acrylic monomer and/or a polyether-containing acrylic monomer with another acrylic monomer.

As used herein, "elastomeric modified polyisocyanate" refers to an NCO-terminal prepolymer prepared by using a diisocyanate such as tolylene diisocyanate (TDI), xylene diisocyanate (XDI), diphenylmethane diisocyanate (MDI), hexamethylene diisocyanate (HDI) or isophorone diisocyanate (IPDI) as the monomer and subjecting this and an active hydrogen-containing compound having elasticity to a urethane reaction. The urethane reaction conditions are not particularly limited, and may in keeping with conventional conditions.

Examples of the active hydrogen-containing compound having elasticity for elastomerically modifying the polyisocyanate include polyester polyols, polycarbonate polyols, polyether polyols, polyolefin polyols, polyols from animals and plants, and copolyols of these. It is especially preferable to include a modified polyisocyanate that has been modified with at least one type of polyol selected from the group consisting of polyester polyols, polyether polyols, polycarbonate polyols, polyolefin polyols, polyols from animals and plants and copolymers of these. To further improve elastomerization and impact resistance of the resulting coat, it is preferable for these polyols to have a glass transition temperature (Tg) of $0°$ C. or below. These polyols may be used singly or two or more may be used in admixture.

In this invention, polyurethane particles are included in the coating composition. The polyurethane particles are exemplified by thermoplastic polyurethane particles and three-dimensionally crosslinked polyurethane particles, such as the polyurethane particles described in JP-A 2017-78149. These polyurethane particles have an average particle size, as measured by the BET method, which is preferably at least $0.1$ μm, and more preferably at least $0.2$ μm. The upper limit is preferably not more than $30$ μm, and more preferably not more than $10$ μm. By thus adding polyurethane particles having an average particle size within a given range to the coating composition, sagging of the coating is suppressed, the film thickness edge ratio between the film thickness at the middle portion and the film thickness at edge portions of dimples is improved, and the scuff resistance, peeling resistance and marking protective effect of the coating layer can be improved.

The content of the above polyurethane particles is less than 5 wt %, preferably less than 3 wt %, and more preferably less than 2 wt %, of the base resin solids in the coating composition. When the content is higher than the upper limit indicated above, this may adversely affect the transparency of the coat. The lower limit in this content is preferably at least $0.1$ wt %, more preferably at least $0.3$ wt %, and even more preferably at least $0.5$ wt %. When this numerical value is too small, the coating layer film thickness uniformity enhancing effect that is a desired effect of the invention becomes smaller.

As mentioned above, the coating composition uses an acrylic polyol or a polyester polyol as the base resin and uses a polyisocyanate as the curing agent. Depending on the coating conditions, various organic solvents may be mixed in. Compounds that may be used as such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

Known compounding ingredients for coatings may be optionally added to the coating composition. For example, suitable amounts of thickeners, ultraviolet absorbers, fluorescent whiteners, slip agents and pigments may be included.

To prevent coating sag and improve the film thickness edge ratio between the film thickness at the middle portion and the film thickness at edge portions of the dimples, it is desirable for the coating composition to have a viscosity as determined by the test method in JIS K5600-2-2 (1999) after the two components—namely, the polyol component and the isocyanate component—have been mixed together which is at least $0.025$ Pa·s, and more preferably at least $0.030$ Pa·s.

When the above coating composition is used, the formation of a coating layer on the surface of golf balls manufactured by a commonly known method may be carried out via the steps of preparing the coating composition at the time of application, applying the composition onto the golf ball surface by a conventional coating operation, and drying the applied composition. The coating method is not particularly limited. For example, spray coating, electrostatic coating or dipping may be suitably used.

The above drying step is similar to that for commonly known two-component curable urethane coatings. The drying temperature may be set to about $40°$ C. or more, and especially between $40°$ C. and $60°$ C.; the drying time may be set to from 20 to 90 minutes, and especially from 40 to 50 minutes.

The effects of the coating composition are pronounced when the composition is applied onto a ball surface that has been subjected to dry surface treatment such as corona discharge treatment, plasma treatment, ultraviolet irradiation treatment or e-beam irradiation treatment. In this case, is it especially preferable to apply plasma treatment.

A method that is commonly used to surface coat golf balls may be employed as the method for applying the above coating composition. Examples of suitable methods include brush coating, spray coating and electrostatic coating. The thickness of the applied coat is preferably from 5 to 50 μm, and more preferably from 10 to 30 μm.

The film thickness edge ratio (%) serves as an indicator for evaluating the uniformity of the applied coat. This edge ratio is preferably 50% or more, and especially 70% or more.

The above coating composition can be used on any golf ball, including one-piece golf balls, two-piece solid golf balls composed of a core and a cover encasing the core, and multipiece solid golf balls composed of a core of one or more layer and a plurality of cover layers encasing the core.

The core can be formed using a known rubber material as the base material. A known base rubber made of natural rubber or synthetic rubber may be used for this purpose. Specific examples include polybutadiene, with the use of primarily cis-1,4-polybutadiene having a cis structure content of at least 40% being recommended. In addition, natural rubber, polyisoprene rubber, styrene-butadiene rubber or the like may be optionally used together with the above polybutadiene in the base rubber. The polybutadiene can be synthesized with a Ziegler catalyst such as a titanium-based, cobalt-based, nickel-based or neodymium-based catalyst, or with a cobalt, nickel or other metal catalyst.

Co-crosslinking agents such as unsaturated carboxylic acids and metal salts thereof, inorganic fillers such as zinc oxide, barium sulfate and calcium carbonate; and organic peroxides such as dicumyl peroxide and 1,1-bis(t-butylperoxy)cyclohexane may be included in the above base rubber. Where necessary, a commercial antioxidant or the like may be suitably added.

The core is a hot-molded product that can be obtained by heating and curing the above rubber composition. The core may be composed of a single layer or of a plurality of layers, and the hot-molded product may be used as all or part of a single-layer or multilayer core. For example, the core can be produced by using a mixing apparatus such as a Banbury mixer or a roll mill to knead the rubber composition, using a core mold to compression mold or injection mold the kneaded composition, and then curing the molded body by suitably heating it under conditions sufficient to allow the organic peroxide or co-crosslinking agent to act, such as at a temperature of between about 100° C. and 200° C. for 10 to 40 minutes.

The cover is a member that encases the core. It has at least one layer, and is also exemplified by a two-layer cover and a three-layer cover. In the case of a two-layer cover, the inner cover layer is sometimes called the intermediate layer and the outer cover layer is sometimes called the outermost layer. In the case of a three-layer cover, the respective layers are sometimes called, in order from the inside: the envelope layer, the intermediate layer and the outermost layer. Numerous dimples are typically formed on the outside surface of the outermost layer in order to enhance the aerodynamic properties of the ball.

The materials making up the respective layers of the cover are not particularly limited, For example, the cover layers may be formed of ionomer resins, polyester resins, polyamide resins and also polyurethane resins. By way of illustration, the intermediate layer can be formed of an ionomer resin or a highly neutralized ionomer resin, and the outermost layer can be formed of a polyurethane resin.

The respective cover layers can be formed in the usual manner by a known injection-molding method. For example, a two-piece golf ball having a core encased by a cover can be produced by injecting the cover material over the core in an injection mold so as to obtain an encased sphere, or by enclosing the core in a pair of pre-molded hemispherical half-cups as the intermediate layer material and then molding under applied heat and pressure to form a cover encasing the core.

Ball properties such as the weight and diameter of the golf ball of the invention can be suitably set according to the Rules of Golf. That is, the ball may be formed to a diameter of at least 42.67 mm and a weight of not more than 45.93.

EXAMPLES

The following Examples and Comparative Examples are provided to illustrate the invention, and are not intended to limit the scope thereof.

Examples 1 and 2, Comparative Examples 1 to 4

Dimpled golf balls having a 40.2 mm diameter core and a 1.25 mm thick ionomer resin cover injection-molded over the core were produced and then marked with specific logos (markings) in the conventional manner, following which a single-layer or two-layer coat was applied as described below.
Single-Layer Coat The coating composition made up of a base resin and a curing agent shown in Table 1 was applied with an automatic spray gun to a coating layer thickness of 15 μm. The applied layer was dried at 55° C. for 1 hour and then furnished for testing.

The polyol component in Table 1 was a mixture of polyacrylic polyol and polyester polyol.
Two-Layer Coat Primer treatment was carried out using an aqueous primer composition made up of the base resin shown in Table 2. This aqueous primer composition was applied with an automatic spray gun to a coating layer (inner layer) thickness of 8 to 9 μm. The aqueous primer composition was a material obtained by mixing together Acrylic Polymer (base resin) and Crosslinker CX-100 (curing agent), both from Cashew Co., Ltd., and water in the weight ratio 100:1.5:3. This mixture was dried at 55° C. for 30 minutes and then furnished for testing.

Next, in keeping with the details shown in Table 1, a coating composition made of the base resin and the curing agent shown in Table 2 was applied with an automatic spray gun to a coating layer (outer layer) thickness of 20 μm. The applied layer was dried at 55° C. for 1 hour and then furnished for testing.

The resulting golf balls in the respective Examples were evaluated for peel resistance, scuffing resistance and the marking protective effect by the test methods described below (sand abrasion resistance test and water abrasion resistance test). The results are shown in Tables 1 and 2.
Sand Abrasion Resistance Test About 4 kg of sand having a particle size of about 5 mm was placed in a 210 mm diameter pot mill and 15 golf balls were charged into the pot mill. The pot mill contents were agitated at a rotational speed of 50 to 60 rpm for 120 minutes. The golf balls were then removed from the mill and the appearance of each golf ball surface was examined and evaluated for "peel resistance," "scuff resistance" and the "marking protective effect" according to the criteria shown below.

Water Abrasion Resistance Test

About 4 kg of sand having a particle size of about 5 mm and water was placed in a 210 mm diameter pot mill and 15 golf balls were charged into the pot mill. The pot mill contents were agitated at a rotational speed of 50 to 60 rpm for 120 minutes. The golf balls were then removed from the mill, irradiated with a UV light (IDHR-100S-UV-365, from Leimac Ltd.; the same applies below), and evaluated for "peel resistance," "scuff resistance" and the "marking protective effect" according to the criteria shown below.

[Peel Resistance]

The peel resistance was evaluated by irradiating the golf ball with a UV light and examining the degree of peeling due to abrasion at the surface of each golf ball. Scores were assigned according to the following criteria, and the average of the evaluation results for five golf balls was treated as the peel resistance.

5 points: no peeling 3 points: minor peeling is apparent 1 point: major peeling is conspicuous

[Scuffing Resistance]

The scuffing resistance was evaluated by magnifying the surface of the golf ball with a magnifier and examining the degree of fine scuffing of the coat. Scores were assigned according to the following criteria, and the average of the evaluation results for five golf balls was treated as the marking protectivity.

5 points: no loss of markings 3 points: some loss of markings 1 point: major loss of markings is apparent Measurement of Coating Composition Viscosity The viscosity of the coating composition was measured immediately following two-component mixture of the polyol and the polyisocyanate. Measurement was carried out by the flow cup method, and the viscosity was characterized in accordance with JIS K5600-2-2-1999. The measurement apparatus used was that available from Anest Iwata Corporation under the product name "NK-2." Measurement was carried out within a chamber set to a temperature of 22.8° C.

Edge Ratio (%)

Figure 1:
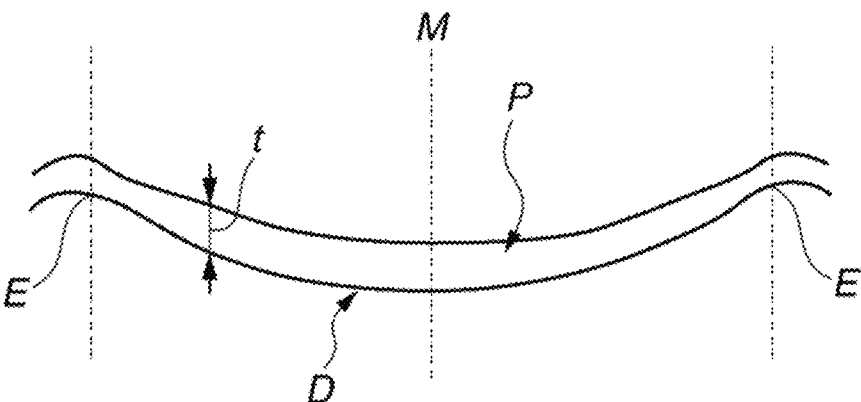
FIG. 1 is a schematic diagram showing the thicknesses of the coating layer (film thicknesses) formed at the middle and edge portions of a dimple in a dimple cross-section.

In the dimple D cross-section shown in FIG. 1, the thickness (film thickness) t of the coating layer P at the middle M and edges E,E of a dimple are determined. The edge ratio (%) is computed as follows:

$$\text{(average film thickness at edges E,E of dimple)/(film thickness at middle M of dimple)} \times 100(\%)$$

The closer the edge ratio is to 100%, the more uniform the film thickness.

TABLE 1

| | | | Example | Comparative Example | |
| --- | --- | --- | --- | --- | --- |
| | | | 1 | 1 | 2 |
| Coating layer (pbw) | Base resin | Polyol | 30 | 30 | 30 |
| | | Ethyl acetate | 70 | 70 | 70 |
| | | Urethane particles | 1 | 0 | 0 |
| | | Silica particles | 0 | 0 | 1 |
| | Curing agent | HDI | 21 | 21 | 21 |
| | | Butyl acetate | 29 | 29 | 29 |
| | Viscosity (Pa · s) | | 0.032 | 0.028 | 0.028 |
| Film thickness | Middle portion (μm) | | 17.3 | 14.9 | 14.9 |
| | Edge portions (μm) | | 14.0 | 10.6 | 11.0 |
| | Edge ratio (%) | | 80.9 | 71.1 | 73.8 |
| Evaluation results | Sand abrasion | Peel resistance | 3.5 | 3.0 | 3.5 |
| | | Scuff resistance | 3.5 | 3.5 | 3.5 |
| | | Marking protective effect | 3.8 | 2.5 | 3.5 |
| | Sand/water abrasion | Peel resistance | 4.0 | 4.0 | 4.0 |
| | | Scuff resistance | 3.8 | 3.5 | 4.0 |
| | | Marking protective effect | 4.0 | 3.5 | 3.5 |

HDI: Hexamethylene diisocyanate according to the following criteria, and the average of the evaluation results for five golf balls was treated as the scuffing resistance.

5 points: no conspicuous scratches 3 points: small scratches are apparent 1 point: large scratches and reduced luster are apparent

[Marking Protectivity]

The marking protectivity was evaluated by magnifying the surface of the golf ball with a magnifier and examining the degree of loss in the markings. Scores were assigned As shown in Table 1, in Example 1, the edge ratio of the coating layer on the dimples is higher than in Comparative Example 1 in which urethane fine particles were not included in the coating composition and higher than in Comparative Example 2 in which silica particles were included in the coating composition, and so it is apparent that the uniformity of the coating layer is improved. Also, it is apparent that the peel resistance, scuff resistance and marking protective effect are improved.

TABLE 2

|  |  |  | Example | Comparative Example | |
|---|---|---|---|---|---|
|  |  |  | 2 | 3 | 4 |
| Coating inner layer (pbw) | Base resin | Acrylic resin | 70 | 70 | 70 |
|  |  | Urethane resin | 30 | 30 | 30 |
| Coating outer layer (pbw) | Base resin | Polyol | 30 | 30 | 30 |
|  |  | Ethyl acetate | 70 | 70 | 70 |
|  |  | Urethane particles | 1 | 0 | 0 |
|  |  | Silica particles | 0 | 0 | 1 |
|  | Curing agent | HDI | 21 | 21 | 21 |
|  |  | Butyl acetate | 29 | 29 | 29 |
|  | Viscosity (Pa · s) |  | 0.032 | 0.028 | 0.028 |
| Film thickness | Inner layer coat | Middle portion (µm) | 8.0 | 8.0 | 8.0 |
|  |  | Edge portions (µm) | 6.0 | 6.0 | 6.0 |
|  | Outer layer coat | Middle portion (µm) | 25.4 | 23.3 | 23.4 |
|  |  | Edge portions (µm) | 21.4 | 15.8 | 17.3 |
|  |  | Edge ratio (%) | 84.3 | 67.8 | 73.9 |
|  | Total film thickness | Middle portion (µm) | 33.4 | 31.3 | 31.4 |
|  |  | Edge portions (µm) | 27.4 | 21.8 | 23.3 |
| Evaluation results | Sand Abrasion | Peel resistance | 4.3 | 3.5 | 3.0 |
|  |  | Scuff resistance | 3.5 | 3.0 | 3.3 |
|  |  | Marking protective effect | 4.0 | 3.5 | 3.5 |
|  | Sand/water abrasion | Peel resistance | 4.5 | 3.0 | 4.5 |
|  |  | Scuff resistance | 4.0 | 3.0 | 3.5 |
|  |  | Marking protecting effect | 4.3 | 3.0 | 4.0 |

As shown in Table 2, in Example 2, the edge ratio of the coating layer on the dimples was higher than in Comparative Example 3 in which urethane fine particles were not included in the coating composition and higher than in Comparative Example 4 in which silica particles were included in the coating composition, and so it is apparent that the uniformity of the coating layer is improved. Also, it is apparent that the peel resistance, scuff resistance and marking protective effect are improved.

Japanese Patent Application No. 2022-203189 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising one or more coating layer on a golf ball surface having a plurality of dimples thereon, wherein at least one coating layer is formed of a two-component curable urethane coating composition comprising a polyol component and a polyisocyanate component, the polyol component being an acrylic polyol or a polyester polyol and the coating composition containing from 0.1 to 5 wt % of polyurethane particles, relative to a base resin solid within the composition.

2. The golf ball of claim 1, wherein the polyurethane particles have an average particle size, as measured by the BET method, which is from 0.1 to 1.0 µm.

3. The golf ball of claim 1, wherein the two-component curable urethane coating composition comprises a polyol component made up primarily of a hydroxyl group-containing polyester polyol having an alicyclic structure on the molecule, and a non-yellowing polyisocyanate.

4. The golf ball of claim 1, wherein the two-component curable urethane coating composition comprises a polyol component made up primarily of an acrylic polyol and an isocyanate component made up primarily of an elastomeric modified polyisocyanate.

5. The golf ball of claim 1, wherein the two-component curable urethane coating composition has a viscosity following mixture of the two components which, as measured by the test method of JIS K 5600-2-2 (1999), is at least 0.025 Pa·s.

* * * * *